US011155496B2

(12) United States Patent
Lotze et al.

(10) Patent No.: US 11,155,496 B2
(45) Date of Patent: Oct. 26, 2021

(54) APPARATUS AND METHOD FOR STABILIZING SHEETS OF A HARD BRITTLE MATERIAL

(71) Applicant: SCHOTT AG, Mainz (DE)

(72) Inventors: Martin Lotze, Nieder-Olm (DE); Thomas Roßmeier, Bodenheim (DE); Clemens Ottermann, Hattersheim (DE); Volker Seibert, Hochheim (DE)

(73) Assignee: SCHOTT AG, Mainz (DE)

( * ) Notice: Subject to any disclaimer, the term of this patent is extended or adjusted under 35 U.S.C. 154(b) by 312 days.

(21) Appl. No.: 15/261,614

(22) Filed: Sep. 9, 2016

(65) Prior Publication Data

US 2017/0073264 A1    Mar. 16, 2017

(30) Foreign Application Priority Data

Sep. 11, 2015   (DE) .................. 102015115346.7
Aug. 31, 2016   (DE) .................. 102016116259.0

(51) Int. Cl.
| | | |
|---|---|---|
| C03C 21/00 | (2006.01) | |
| C03B 13/00 | (2006.01) | |
| C03B 35/16 | (2006.01) | |
| C03B 35/18 | (2006.01) | |
| B65H 23/16 | (2006.01) | |

(52) U.S. Cl.
CPC .......... C03C 21/002 (2013.01); B65H 23/16 (2013.01); B65H 2301/51212 (2013.01); B65H 2404/20 (2013.01); B65H 2406/32 (2013.01); B65H 2557/24 (2013.01); B65H 2801/61 (2013.01)

(58) Field of Classification Search
CPC ............ C03C 21/00–008; C03C 1/002; C03B 27/03–035; B65H 2701/1311; B65H 2701/1315
See application file for complete search history.

(56) References Cited

U.S. PATENT DOCUMENTS

| | | | | |
|---|---|---|---|---|
| 2,890,134 A | * | 6/1959 | Linden ...................... | C23C 2/12 427/310 |
| 3,307,930 A | * | 3/1967 | Stevens ................. | C03B 23/027 65/103 |
| 3,506,428 A | * | 4/1970 | Kiyoshi ................. | C03B 18/02 65/182.4 |
| 3,661,735 A | * | 5/1972 | Drelich ................. | B01J 19/088 204/165 |

(Continued)

FOREIGN PATENT DOCUMENTS

| | | |
|---|---|---|
| CN | 1683587 | 10/2005 |
| CN | 103028618 | 3/2015 |

(Continued)

OTHER PUBLICATIONS

Of Riedel, Karl Locally optimal knots and tension parameters for exponential splines. Journal of Computational and Applied Mathematics vol. 196 (2006) as viewed at Science Direct on Jul. 19, 2018 (Year: 2006).*

*Primary Examiner* — Erin Snelting

(74) *Attorney, Agent, or Firm* — Ohlandt, Greeley, Ruggiero & Perle, L.L.P.

(57) ABSTRACT

A method and an apparatus for stabilizing the position of a sheet-like element made of hard brittle material during transportation thereof along a transport path is provided in which the element is guided through a roller chicane having three rollers.

22 Claims, 6 Drawing Sheets

(56) References Cited

U.S. PATENT DOCUMENTS

| | | | |
|---|---|---|---|
| 3,681,040 A * | 8/1972 | Pierre-Dit-Mery | C03B 18/14 65/30.14 |
| 4,273,832 A * | 6/1981 | Hogan | C03C 21/002 365/154 |
| 4,759,985 A * | 7/1988 | Armiger | C03C 25/26 428/367 |
| 4,911,743 A * | 3/1990 | Bagby | C03B 27/00 65/30.13 |
| 4,935,605 A * | 6/1990 | Yasunaga | G11B 5/84 162/197 |
| 4,936,140 A * | 6/1990 | Houghton | G01N 3/08 73/159 |
| 4,946,930 A * | 8/1990 | Takasa | B29C 55/005 264/210.7 |
| 5,101,661 A * | 4/1992 | Cresson | G01L 5/10 73/159 |
| 5,871,134 A | 2/1999 | Komagata et al. | |
| 6,021,790 A | 2/2000 | Yoshitani et al. | |
| 6,070,472 A | 6/2000 | Kipping et al. | |
| 6,092,392 A * | 7/2000 | Verlinden | G03C 1/765 65/148 |
| 6,502,423 B1 | 1/2003 | Ostendarp et al. | |
| 6,758,064 B1 | 7/2004 | Kariya | |
| 7,032,320 B2 * | 4/2006 | Ischdonat | G01L 5/102 33/501.02 |
| 7,058,618 B2 * | 6/2006 | Loosen | G01N 3/08 706/16 |
| 7,461,564 B2 | 12/2008 | Glaesemann | |
| 7,796,327 B2 * | 9/2010 | Sasaki | B32B 27/18 359/350 |
| 8,443,629 B2 * | 5/2013 | Kuroiwa | C03B 23/037 65/106 |
| 8,707,736 B2 * | 4/2014 | Gibson | B32B 17/10036 65/94 |
| 8,889,254 B2 * | 11/2014 | Bayne | C03C 15/02 428/215 |
| 8,974,268 B2 * | 3/2015 | Darcangelo | B24B 1/005 451/44 |
| 9,038,414 B2 * | 5/2015 | Fleming | B65H 23/0212 65/160 |
| 2003/0109370 A1 * | 6/2003 | Ikenishi | B24B 37/042 501/66 |
| 2005/0224551 A1 | 10/2005 | Hein | |
| 2008/0083288 A1 * | 4/2008 | Glaesennann | G01N 3/20 73/849 |
| 2011/0005412 A1 * | 1/2011 | Fujii | B29C 59/04 101/216 |
| 2011/0177290 A1 | 7/2011 | Tomamoto | |
| 2011/0247681 A1 * | 10/2011 | Wu | B29C 47/0021 136/251 |
| 2013/0047671 A1 * | 2/2013 | Kohli | C03B 17/061 65/30.13 |
| 2013/0059087 A1 * | 3/2013 | Veerasamy | C03C 21/007 427/446 |
| 2013/0302618 A1 * | 11/2013 | Kuhnemann | C03C 3/087 428/410 |
| 2014/0060201 A1 * | 3/2014 | Huang | G01N 3/20 73/826 |
| 2014/0116090 A1 * | 5/2014 | Lee | H05B 6/78 65/30.14 |
| 2014/0220300 A1 * | 8/2014 | Ullmann | B32B 17/066 428/141 |
| 2014/0227525 A1 * | 8/2014 | Matsuda | C03C 21/002 428/410 |
| 2014/0283554 A1 * | 9/2014 | Fredholm | C03B 17/062 65/91 |
| 2014/0284412 A1 * | 9/2014 | Merz | B65H 18/00 242/160.4 |
| 2015/0344347 A1 * | 12/2015 | Fleming | C03B 35/164 65/29.18 |
| 2016/0033379 A1 * | 2/2016 | Heiss-Chouquet | G01N 3/08 73/834 |
| 2016/0033380 A1 | 2/2016 | Heiss-Choquet et al. | |
| 2016/0207726 A1 | 7/2016 | Ortner et al. | |
| 2016/0214889 A1 * | 7/2016 | Garner | B32B 17/064 |
| 2016/0251262 A1 * | 9/2016 | Gomez | C03C 21/002 65/30.14 |
| 2016/0272453 A1 | 9/2016 | Seol | |
| 2016/0326051 A1 * | 11/2016 | Kim | C03C 23/0075 |
| 2017/0074762 A1 * | 3/2017 | Lotze | G01N 3/20 |
| 2017/0113963 A1 * | 4/2017 | Kim | C03B 25/08 |
| 2017/0183258 A1 * | 6/2017 | Ottermann | B65D 85/48 |
| 2017/0183259 A1 * | 6/2017 | Da | C03C 15/02 |

FOREIGN PATENT DOCUMENTS

| | | | |
|---|---|---|---|
| DE | 19704447 | 8/1998 | |
| DE | 69818541 | 8/2004 | |
| DE | 102013110803 | 4/2015 | |
| DE | 102014110856 | 2/2016 | |
| DE | 102015108553 | 12/2016 | |
| EP | 1048621 | 11/2000 | |
| EP | 1637866 | 3/2006 | |
| JP | 2010132347 | 6/2010 | |
| WO | 2010101961 | 9/2010 | |
| WO | WO-2013066672 A1 * | 5/2013 | ........... B32B 17/065 |
| WO | WO-2014139147 A1 * | 9/2014 | ............. C03C 15/00 |
| WO | WO-2015057552 A2 * | 4/2015 | ....... B32B 17/10137 |
| WO | 2015065052 | 5/2015 | |

* cited by examiner

Fig. 1
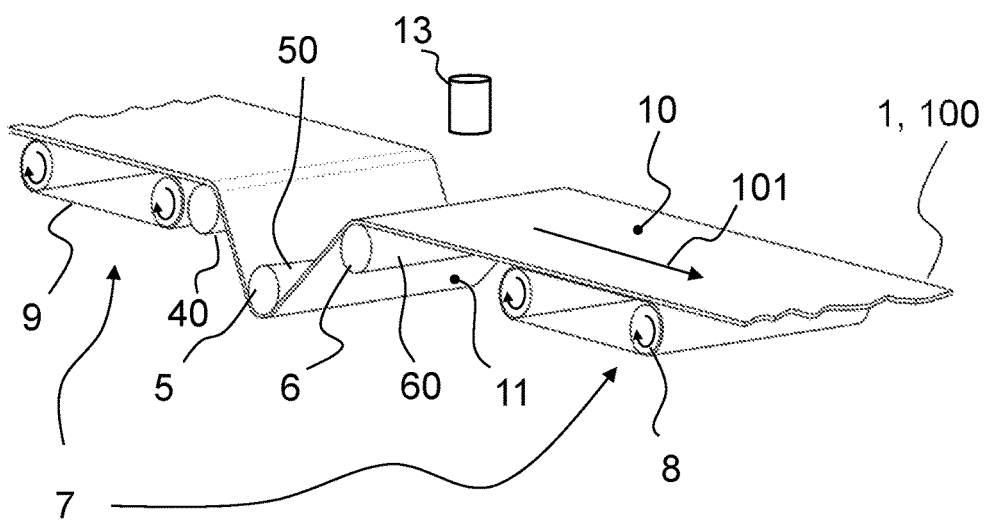
Fig. 2
Fig. 3
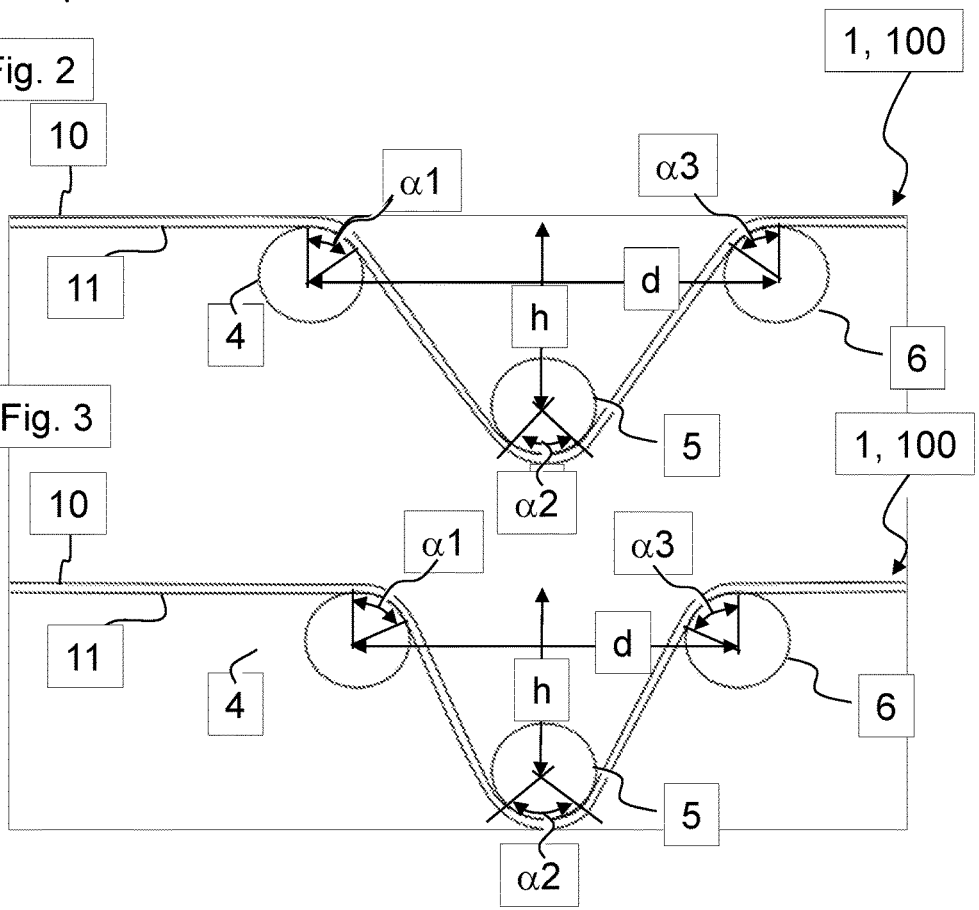

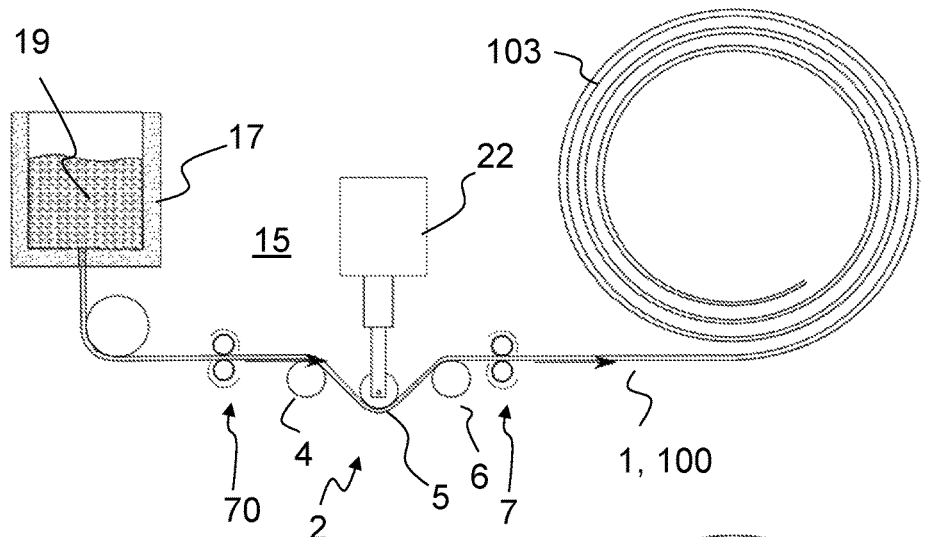
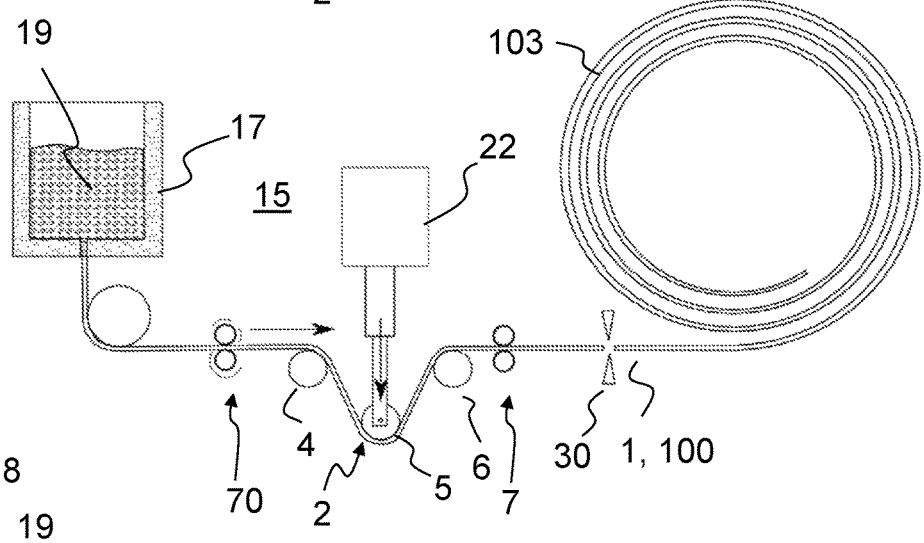
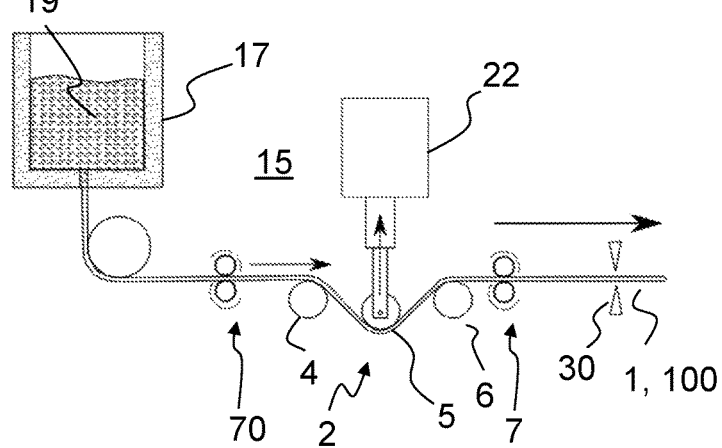

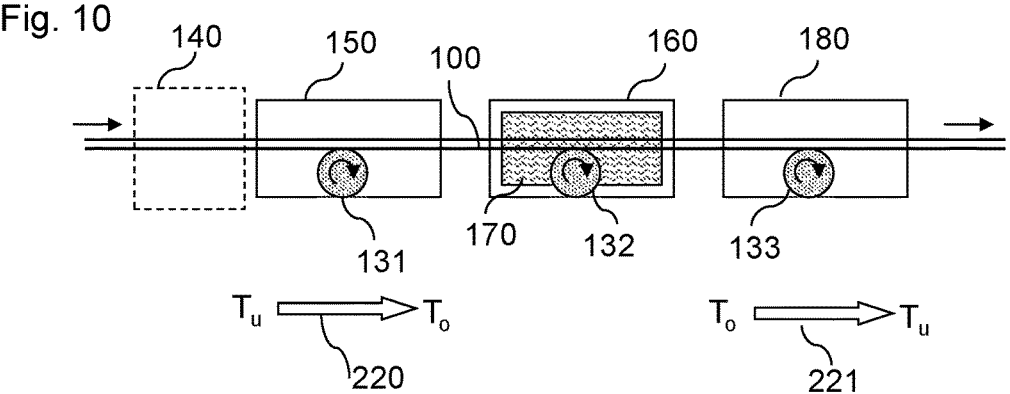
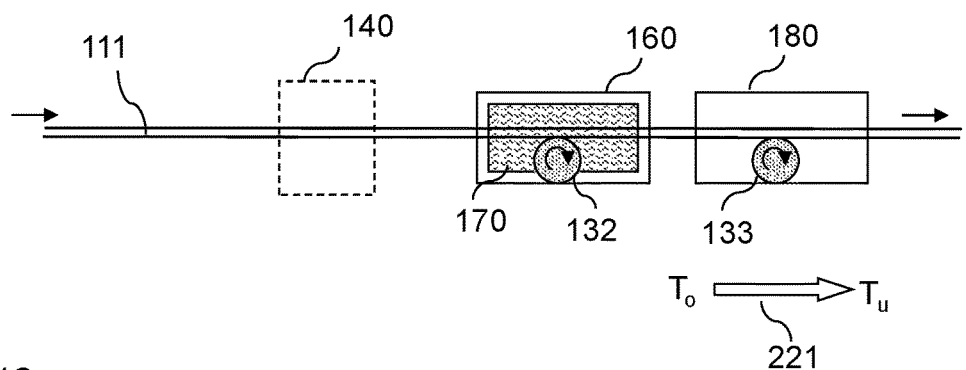

APPARATUS AND METHOD FOR STABILIZING SHEETS OF A HARD BRITTLE MATERIAL

CROSS REFERENCE TO RELATED APPLICATIONS

This application claims benefit under 35 U.S.C. § 119(a) of German Patent Application No. 10 2015 115 346.7 filed Sep. 11, 2015 and German Patent Application No. 10 2016 116 259.0 filed Aug. 31, 2016, the entire contents of both of which are incorporated herein by reference.

BACKGROUND

1. Field of the Invention

The invention generally relates to stabilization of the position of sheet-like material. More particularly, the invention relates to the stabilization of the position of sheets made of hard brittle material, in particular glass.

2. Description of Related Art

In the manufacturing of thin glass, glass sheets or glass ribbons are drawn from a melt. Such a glass ribbon can be deflected into a horizontal transportation direction and wound up to form a roll, with or without border.

In further process steps, the glass with or without border may be rewound from one roll into another, or may be unwound from the roll to be separated into ribbon portions or sheets of any free shape.

From at least two ribbon portions or from a plurality of sheets, rolls may again be prepared. For this purpose, the portions or sheets are typically joined by a bonding agent.

When winding up a continuous glass ribbon, one or more layers of a non-abrasive plastic film may be provided between the individual layers of the glass ribbon in order to protect the surface of the glass ribbon from dirt and/or mechanical damage.

During transportation, individual sheets may for example as well be arranged on an adhesive film serving as a carrier tape, which is wound up. Also, rolls may again be formed from at least two ribbon portions or from a plurality of sheets.

Furthermore, the sheets may as well be inserted between two carriers. The one or more carriers might as well be functionalized, for example by being provided with functional coatings, such as optical, electronic, or opto-electronic layers.

Instead of being wound, the glass ribbon or adhesive film with individual sheets thereon may as well be arranged in a meandering configuration.

For transportation of the glass ribbon, transport means with rollers are used. For example, U.S. Pat. No. 7,461,564 B2 discloses various arrangements of rollers, such as a chicane made up of three rollers in FIG. 6.

During transportation of the glass ribbon, instabilities in the course of the glass sheet may arise due to undulations in or transversely to the advancement direction. Such instabilities may result in deviations from the winding level and damage to the glass or even breakage of the ribbon, if the glass ribbon is subsequently wound up.

Winding level herein refers to the nature of the end faces of the wound-up glass ribbon. The end faces of the cylinder formed by winding up the glass ribbon are defined by the superimposed edges of the glass ribbon. Ideally, the edges of the glass ribbon are flush with each other in the wound state, so that the two end faces are completely even.

However, undulations perpendicular to the advancement direction of the glass ribbon will cause movements of the glass ribbon transversely to the advancement direction or longitudinal extension of the ribbon. Due to such movements, the edges of the glass ribbon will no longer flush with one another when wound up. Both of the two end faces of the wound glass ribbon will no longer be even, since the individual layers of the glass ribbon are offset from each other.

If, for example, an adhesive film is disposed between the individual layers of the glass ribbon, it may project beyond the edges of the glass layers. In this case, the quality of the winding level is specified by the offset of the individual glass layers from each other.

The lower the quality of the winding level, i.e. the greater the offset of the individual glass layers from each other, the more stress conditions will arise in the wound glass ribbon. In particular during further processing steps this might cause problems and even cracking of the glass and break of the ribbon as a consequence thereof.

Therefore, a highest possible quality of the winding level is desirable, the quality of the winding level being measured in multiples of the glass thickness. This is done given the fact that in particular thin glasses, that means glasses having a thickness of not more than 300 µm are to be transported and processed.

SUMMARY

Therefore, an object of the invention is to provide an apparatus and a method for stabilizing the transportation and alignment of the glass ribbon so as to obtain an enhanced quality of the winding level as a result.

Accordingly, the invention provides a method for stabilizing the position of a sheet-like element made of hard brittle material, in particular glass, during transportation thereof along a transport path, the sheet-like element having an upper face and a lower face and two outer edges, the method comprising the steps of: providing a sheet-like element of a predetermined material type and thickness; and providing a deflection arrangement comprising at least one deflection element adapted for deflecting the sheet-like element of hard brittle material along its transport path with a directional component perpendicular to the surface thereof, whereby the sheet-like element is bent.

The deflection element is mounted for pivoting or moving perpendicularly to the surface of the element so that the position of the surface of the sheet-like element can be altered by a movement of the deflection element.

Preferably, the deflection arrangement comprises a plurality of deflection elements, more preferably three of such elements, in particular a first mechanically effective element having a first surface, a second mechanically effective element having a second element surface, and a third mechanically effective element having a third element surface.

In a preferred embodiment, the first element is arranged at a distance from the third element, and the second element is arranged between the first and third elements, and at least one of the elements, preferably the second element, is movably mounted by means of a rocker bearing, so that the movably mounted element is pivotable about a pivot axis extending perpendicularly to the rotation axis thereof. Furthermore, the method of the invention may comprise guiding the sheet-like element along the transport path thereby passing the upper or lower face thereof at least once over the at least one deflection element.

If a plurality of deflection elements are provided, the sheet-like element is bent over the three elements along an undulated path, and each of the faces is in contact with the element surfaces.

The deflection elements are mechanically effective elements imparting forces or moments to the sheet-like element.

In a particularly preferred embodiment of the invention, these mechanically active elements are defined by rollers. Therefore, without loss of generality, the deflection elements will also be referred to as rollers below.

These rollers may in particular be monolithic rollers, but may as well consist of a plurality of spaced elements.

However, the mechanically effective elements may as well comprise other forms of deflection elements, such as e.g. levitation or vacuum elements.

If sheets disposed on carriers are processed, the elements may be configured so as to only contact the carrier, i.e. only between the individual sheets.

The second roller may in particular be located at a level below a connecting line connecting the first and third rollers in order to achieve a wavy or undulating guidance of the element over the rollers.

What is decisive for reducing the risk of fracture of the sheet-like element is the geometry of the roller chicane defined by the three rollers. This geometry is described by the distance between the two outer rollers and the position of the surface of the intermediate roller relative to the connecting line of the two outer rollers.

Therefore, in a preferred embodiment of the method according to the invention the distance between the first and third rollers is chosen as a function of the thickness of the sheet-like element.

The sheet-like element to be transported may have surface irregularities which might be related to the manufacturing process or may be created in the form of a wavy profile only when contacting the rollers.

Therefore, in a further embodiment of the method according to the invention the second roller is moved in vertical direction to compensate for irregularities in the surface contour, in particular for corrugations, of the sheet-like element.

The method of the invention is preferably employed for transportation of a glass ribbon. Therefore, one embodiment of the method according to the invention comprises, after the guiding of the sheet-like element, the step of winding up the sheet-like element, and once wound up layers of the sheet-like element will be superimposed one above the other.

The quality of the winding level is of particular importance as a target parameter for winding into a roll.

The embodiments of the inventive method described so far do not include any measure allowing for an actively controlled improvement of the quality of the winding level.

Therefore, a particularly preferred embodiment of the inventive method further comprises the steps of monitoring the course of the outer edges of the sheet-like element for a deviation from a straight course during the guiding of the sheet-like element, using a sensor or monitoring means; and correcting for the deviation of the course of the outer edges of the sheet-like element from a straight course during the guiding of the sheet-like element by pivoting the second roller and/or adjusting the vertical position of at least one of the first, second, and third rollers.

The method of the invention is preferably employed in an environment in which the sheet-like element is a glass ribbon having a predetermined thickness, which is guided over the rollers in a direction along its longitudinal extension.

If the method of the invention is employed for a glass ribbon, the latter is particularly preferably wound up into a roll after having been guided over the rollers, and in this case the quality of the winding level defined as the mean deviation of the position of the outer edges from the mean value of the position of the outer edges is less than 2.0 mm, preferably less than 0.5 mm, more preferably less than 0.2 mm.

Also within the scope of the invention is an apparatus for stabilizing the position of a hard brittle material, in particular a glass ribbon, during transportation thereof along a transport path. This apparatus comprises a deflection arrangement comprising at least one deflection element adapted for deflecting the sheet-like element of hard brittle material along its transport path with a directional component perpendicular to the surface thereof whereby the sheet-like element is bent, and the deflection element is mounted for pivoting or moving perpendicularly to the surface of the element so that by a movement of the deflection element the position of the surface of the sheet-like element can be altered.

Preferably, the deflection arrangement comprises three deflection elements, in particular a first mechanically effective element having a first element surface, a second mechanically effective element having a second element surface, and a third mechanically effective element having a third element surface, wherein the first element is located at a distance from the third element; and the second element is disposed between the first element and the third element; and wherein at least one of the elements, preferably the second element, is movably mounted by means of a rocker bearing so that this element is pivotable about a pivot axis extending perpendicularly to the rotation axis thereof; wherein along the transport path the sheet-like element is at least once guided over one of the elements with the upper and lower face thereof whereby the sheet-like element is bent so that each of the faces is in contact with the element surfaces and is bent to adopt a wavy course.

In a particularly preferred embodiment of the apparatus according to the invention, the mechanically effective elements are rollers which may be formed integrally but may as well consist of a plurality of spaced elements.

It is furthermore possible for the mechanically effective elements to comprise deflection elements of a levitation or vacuum type.

In a preferred embodiment, the apparatus comprises a fourth roller onto which the sheet-like element is wound up after having passed through the roller chicane.

Furthermore, a modification of the apparatus according to the invention is provided, which comprises a sensor adapted to detect deviations of the course of the sheet-like element from a straight course. Furthermore, this modification of the inventive apparatus comprises monitoring means adapted to correct for any detected deviations of the course of the sheet-like element from a straight course by adjusting at least one of the rollers so that the quality of the winding level which is defined as the mean deviation of the position of the outer edges from a mean value of the position of the outer edges is less than 2.0 mm, preferably less than 0.5 mm, more preferably less than 0.2 mm.

Also within the scope of the invention is a glass manufacturing system which comprises a hot-forming apparatus for forming a sheet-like glass article, in particular a glass ribbon, and an apparatus according to the invention for stabilizing the position of a sheet-like element during transportation thereof along a transport path.

Also according to the invention, a roll of wound glass is provided wherein the glass has a thickness of less than 300 µm and wherein the roll is producible by the method of the invention for stabilizing the position of a sheet-like element. Due to the inventive stabilization of the position of the ribbon transversely to the advancement direction it is possible to obtain a particularly even winding level. According to a preferred embodiment of the invention, the average deviation of the position of the edges of superimposed layers of the glass ribbon is less than 2.0 mm, preferably less than 0.5 mm, more preferably less than 0.2 mm.

According to one embodiment of the invention, the glass ribbon is chemically toughened during the method according to the invention. Chemical toughening is performed by ion exchange. The process of chemical toughening comprises at least the following method steps a) to c):
(a) preheating the glass ribbon to a temperature in a range from 300 to 550° C.;
(b) chemically toughening the glass ribbon by ion exchange in the surface zones at a toughening temperature in a range from 350 to 550° C.; and
(c) cooling the glass ribbon (100) to a temperature of less than 150° C.

After the process of chemical toughening the glass ribbon is wound up using the inventive method.

According to one embodiment of the toughening process, the glass ribbon has a thickness of less than 300 µm, preferably in a range from 30 to 144 µm. The glass ribbon is chemically toughening by an ion exchange during which in particular sodium and/or lithium ions in near-surface regions of the glass ribbon are at least partially replaced by potassium ions. To this end, potassium ions are applied to the glass ribbon prior to step a) and/or in step b).

First, in step a), the glass ribbon is heated to a temperature in a range from 300 to 550° C. whereby the thin glass is preheated to the temperature at which chemical toughening takes place in step b). The preheating to the toughening temperature prevents stresses from arising in the thin glass due to an excessively large temperature difference during the chemical toughening or due to a too rapid heating of the glass and therefore prevents the thin glass from breaking during the toughening. Preheating may be performed in a continuous furnace, for example. This variant is especially appropriate when the glass ribbon is already provided in the form of a glass roll that is to be unwound and subsequently to be rewound into a glass roll. Thus, the toughening process can be integrated in a roll-to-roll process.

In another variant the glass ribbon already has a temperature of about the toughening temperature, for example because of a drawing process. In this case, active heating of the glass ribbon in step a) may therefore be dispensed with.

Once the thin glass has been preheated to the toughening temperature in step a), the thin glass is chemically toughened by ion exchange at the glass surface in step b). Here, an ion exchange takes place in which lithium and/or sodium ions in the near-surface regions of the glass are partially replaced by potassium ions which previously have been applied to the glass surface.

In the subsequent step c) the toughened glass ribbon is cooled to a temperature of less than 150° C. Method steps a) to c) are performed in continuous furnaces.

According to one embodiment of the toughening process, the glass ribbon is heated in step a) in a continuous furnace having a temperature gradient. In this way, the glass ribbon is heated very gently and so stresses in the glass are avoided.

The furnace used in step a), referred to as preheating furnace below, has a temperature gradient which increases from one end of the furnace toward the other end. Thus, at one end the furnace has a lower temperature $T_u$ and at the other end it has a higher temperature $T_o$, with $T_u < T_o$. The temperature of the furnace rises along the advancement direction of the glass ribbon, i.e. the glass ribbon enters the furnace at the end of the furnace having the temperature $T_u$. A temperature gradient between a lower temperature $T_u < 150°$ C. and a higher temperature $T_o$ in the range from 350 to 500° C. has been found particularly advantageous with regard to the reduction of stresses in the glass ribbon and processing times. Preferably, the higher temperature $T_o$ corresponds to the toughening temperature $T_H$.

In step b), the glass ribbon is chemically toughened by at least partially replacing sodium and/or lithium ions by potassium ions in near-surface regions of the glass ribbon. In this case, the potassium ions are applied to the surface of the glass ribbon prior to the toughening process. The desired penetration depth of layer (DOL) of the potassium ions and the degree of increase in strength Cs can be adjusted via process parameters toughening temperature $T_H$ and toughening time $t_H$. The toughening time $t_H$, that is the dwell time in the toughening furnace, may be adjusted through the feeding rate of the glass ribbon and the length of the toughening furnace or the length of the transport path traversed by the glass ribbon in the toughening furnace. Suitable materials for the roller in the toughening furnace are in particular glass, ceramics, metal, or composites of these materials.

After toughening in step b), the toughened glass ribbon is cooled in step c). In order to avoid stresses in the toughened glass it is advantageous to use a furnace having a temperature gradient. The furnace is preferably configured as a continuous furnace and has a higher temperature $T_o$ at one end and a lower temperature $T_u$ at the other end. The toughened glass ribbon is passed through the furnace by entering the furnace at the end of the furnace having the higher temperature $T_o$, being cooled within the furnace, and leaving the furnace at temperature $T_u$. A lower temperature $T_u$ of <150° C. has been found advantageous. The higher temperature $T_o$ of the furnace is preferably from 350 to 550° C. In particular a higher temperature $T_o$ corresponding to the toughening temperature $T_H$ in the preceding step b) has been found particularly advantageous.

One embodiment of the toughening process contemplates to use the same continuous furnace having a temperature gradient in step a) and in step c). Since in this case only one furnace is needed, this permits to make the apparatus more compact and to save energy.

The toughening process during the transportation according to the invention may be performed after the drawing process before winding into a glass roll. The drawn glass ribbon is cleaned, dried, and toughened. Since the glass is drawn at high temperatures and thus has a correspondingly high temperature prior to the toughening process, the preheating duration may be reduced or this process step may even be omitted entirely. This is especially applicable if after the drawing process the glass ribbon has a temperature of about the toughening temperature $T_H$.

According to a variant, the potassium ions may be applied to the surface of the glass ribbon by passing the glass ribbon through a potassium-containing melt, in step b). The melt may contain $KNO_3$, for example.

Alternatively or in addition, a potassium-containing salt solution may be applied to the upper and lower surface of the glass ribbon, i.e. the upper and lower face of the glass ribbon. In this case, application of the potassium ions is accomplished before the glass ribbon is passed through the toughening furnace. Preferably, the potassium-containing salt solution is applied prior to the preheating of the glass ribbon (step a)). Besides the preheating of the glass ribbon, the solvent is evaporated in step a) in this case.

The potassium-containing salt solution may be applied onto the surface of the glass ribbon by spraying. Preferably, the potassium-containing salt solution is an aqueous solution of salts $KNO_3$, $K_3PO_4$, $KCl$, $KOH$, and/or $K_2CO_3$.

In this manner, a glass roll including an alkali-containing chemically toughened thin glass with a thickness of less than 300 μm can be obtained. It is even possible to obtain glass rolls of chemically toughened thin glass having a glass thickness in a range from only 30 to 145 μm.

The glass ribbon is in particular enriched with potassium ions in regions near the surface thereof. In one embodiment, the penetration depth of layer (DOL) is up to 30 μm. Preferably, the glasses of the glass roll have a penetration depth DOL of about 2 to 8 μm, more preferably of about 3 to 5 μm. Glasses with such DOLs have a sufficiently high strength to be employed as cover glass for touch-sensitive displays in mobile electronic devices, for example. At the same time, only short toughening durations are required for such relatively low exchange depths, which is advantageous in terms of processing. For example, toughening time $t_H$ may be reduced to a duration of less than one hour or even less than 30 minutes. Even toughening times $t_H$ of about 10 to 20 minutes are possible.

In the case where the toughening process is integrated in the transportation process of the glass ribbon, the aspect of a shortest possible toughening time $t_H$ is of higher relevance than with the conventional method in which the glass remains stationary in a salt melt during the ion exchange. In the integrated toughening process, long toughening durations $t_H$ would slow down the entire transportation process and require very low advance rates and/or a long transport path within the toughening furnace.

BRIEF DESCRIPTION OF THE DRAWINGS

The invention will now be described in more detail by way of further embodiments and with reference to the accompanying drawings. In the drawings in which like reference numerals designate the same or equivalent elements:

FIG. 1 illustrates the basic setup of an apparatus for transporting a sheet-like element made of hard brittle material;

FIG. 2 is a side view of a roller chicane;

FIG. 3 is another side view of a roller chicane;

FIG. 6 shows an apparatus for transporting a sheet-like element together with a reservoir for the element in its raw state and with the element in wound-up state;

FIG. 7 shows the apparatus of FIG. 6, with additionally provided severing means;

FIG. 8 shows the apparatus of FIG. 7, with the wound roll discharged;

FIG. 10 is a schematic view of the toughening process during which the glass ribbon to be toughened is passed through a molten salt bath;

FIG. 11 is a schematic view of a modification of the invention in which the drawing process for forming a thin glass ribbon is directly followed by the toughening process;

FIG. 12 is a schematic view of another embodiment of the toughening process in which the potassium ions are applied onto the glass ribbon in the form of an aqueous solution;

DETAILED DESCRIPTION

Figure 4A:
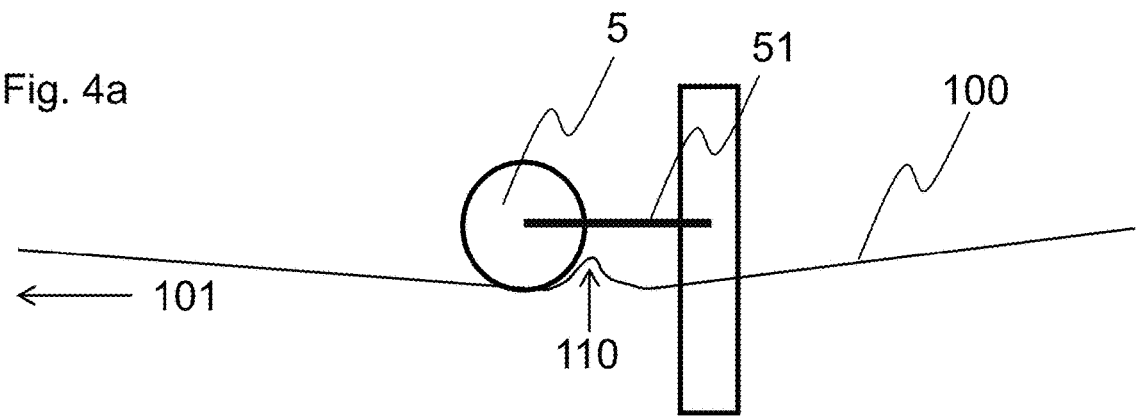
FIG. 4a is a side view of a rigidly mounted roller with a glass ribbon to be transported.

FIG. 1 shows basic components of an apparatus for transporting a sheet-like element 1 made of hard brittle material. Due to its sheet-like shape, the element 1 has an upper face 10 and a lower face 11 opposite to each other. Typically, these faces 10, 11 extend in parallel to one another.

According to a particularly preferred embodiment, the hard brittle material comprises glass. Furthermore, the element 1 is a glass ribbon 100. Glass ribbon 100 is moved in a direction along its longitudinal extension 101 by transport means 7 while the element 1 or specifically the glass ribbon passes through an arrangement of a first roller 4, a second roller 5, and a third roller 6 which together define an apparatus 2 for stabilizing the element 1 or glass ribbon 100. This apparatus 2 forms a roller chicane.

The use of rollers is a particularly preferred embodiment of the invention. As explained above, various other types of mechanically effective elements may be used instead of the rollers.

The element 1 is bent over rollers 4, 5, 6. The glass ribbon 100 is guided in a manner so that the element 1 passes over each of the three roller 4, 5, 6 at least once with at least one of its faces. Specifically, glass ribbon 100 is guided over rollers 4 and 6 with its face 11, and is guided over the intermediate roller 5 with the opposite face 10. Because the two faces of element 1 are guided over rollers 4, 5, 6 at least once, a wavy or undulating course of the ribbon is resulting in the roller chicane.

The first roller 4 has a surface 40, the second roller 5 has a surface 50, and the third roller has a surface 60.

Specifically, the glass ribbon 100 first runs over roller 4 with its lower face 11, then over roller 5 with its upper face 10, and then over the third roller 6 with its lower face 11, whereby the glass ribbon is bent. The curvature of the faces 10, 11 running over the rollers 4, 5, 6 is concave, that of the opposite face is convex. At the convex curvature a tensile stress is caused which is determined by the radius of curvature, while the respective face running over roller surfaces 40, 50, 60 is subjected to a compressive stress in the region of the concave curvature thereof. The latter is not critical and will not cause any breakage.

In order to move the glass ribbon 100 over the rollers 4, 5, 6, transport means 7 are provided. On the one hand, element 1, or glass ribbon 100 in the present case, is advanced by the transport means 7, on the other hand a tensile force is exerted on the element 1 in the direction of advancement so that both faces 10, 11 are subjected to a tensile stress of at least 2 MPa. This tensile stress adds to the tensile stress caused at the upper or lower face 10, 11 facing away from the roller surface due to the bending over of the respective roller, so that a resultant tensile stress is defined.

According to one embodiment of the invention, the tensile force on element 1 is exerted by the pulling action of a conveyor belt 8 downstream of rollers 4, 5, 6 in the direction of advancement, on which the element 1 is adhering. In particular, element 1 might be adhered to conveyor belt 8 by suction. According to this embodiment of the invention, therefore, conveyor belt 8 is a vacuum conveyor belt. In order to establish a tensile force by the drive of conveyor belt 8, means for retaining the element 1 are utilized. A simple way to implement this is to provide a further conveyor belt 9 to which the element 1 is adhered. In particular, this further conveyor belt 9 may also be a vacuum conveyor belt.

As already stated above, the entirety of the three rollers 4, 5, 6 in the form of a roller chicane defines an apparatus 2 for stabilizing the element 1 or glass ribbon 100. The axes of all three rollers 4, 5, 6 can be adjusted manually both horizontally and vertically by means of a spindle. According to the invention, the roller axis must not tilt during the adjustment operation.

Rollers 4 and 6 are arranged with a horizontal distance d (FIGS. 3, 4) therebetween. This distance d is between 50 and 500 mm in the invention.

Rollers 4, 5, 6 having a width of 1000 mm are employed. The radius of the rollers 4, 5, 6 is between 10 and 200 mm, and the rollers can be exchanged.

The material selected for the surface of rollers 4, 5, 6 is EUROTEC-AS 84656 EPOM, 70 Shore A.

The second or intermediate roller 5 may be arranged at a lowered position at a height h (FIGS. 3, 4) below the plane in which the element 1 or glass ribbon 100 is conveyed. According to the invention, this height difference is 0 to 300 mm. Due to the lowering of the second roller 5 with respect to rollers 4 and 6, the three rollers 4, 5, 6 of apparatus 2 form a roller chicane. As illustrated, this lowering refers to the position of the axis of rotation.

FIGS. 2 and 3 each show such a roller chicane where the sheet-like element 1 or a glass ribbon 100 is passed over three rollers 4, 5, 6 in a manner so that the glass ribbon 100 runs above rollers 4 and 6 and below roller 5. For each of the three rollers 4, 5, 6 the wrap angle is indicated. It is determined by drawing a straight line from the first and last points of contact of ribbon 100 with the respective roller to the center of the roller. The angle enclosed by these two straight lines is the wrap angle. At the first roller 4 the wrap angle is $\alpha_1$, at the second roller 5 the wrap angle is $\alpha_2$, and at the third roller 6 the wrap angle $\alpha_3$.

In FIG. 3, the distance between rollers 4 and 6 is reduced in comparison to FIG. 2, which results in a larger wrap angle $\alpha_3$ at second roller 5.

The height above ground, at which the glass ribbon 100 is conveyed, is from 900 to 1000 mm.

The advancement rate of glass ribbon 100 is from 3 to 30 m/min.

When the sheet-like element 1 contacts one of rollers 4, 5, 6, buckling of the element might be caused. This is shown in FIG. 4a for the case of a rigidly mounted second roller 5. Second roller 5 is supported by a rigid bearing 51. Glass ribbon 100 is conveyed in a direction along its longitudinal extension 101 and engages on second roller 5. In front of second roller 5, a wavy buckling 110 will arise. This buckling will be pronounced in the case of a rigidly mounted second roller 5, which is associated with a high risk of fracture.

Figure 4B:
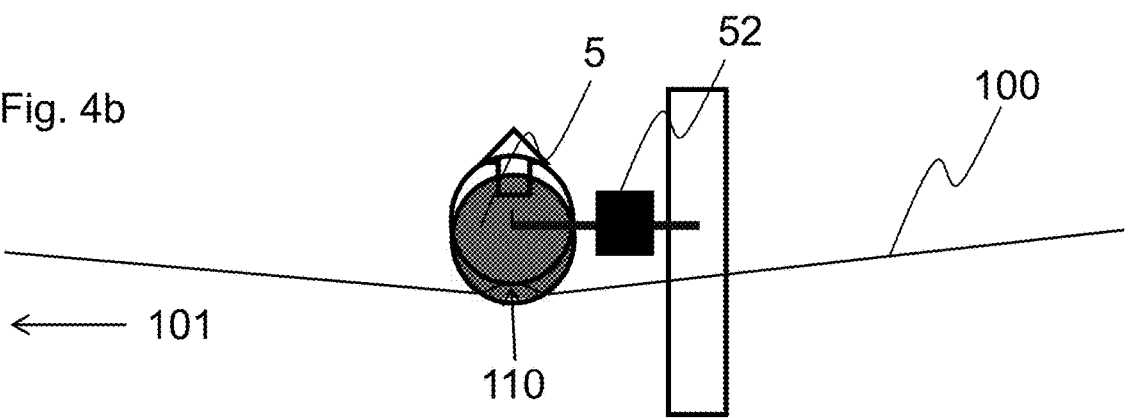
FIG. 4b is a side view of a roller with rocker bearing with a glass ribbon to be transported.

Therefore, according to the invention, at least one of rollers 4, 5, 6, preferably the second roller 5, is movably mounted so that this roller is able to respond to variations in the alignment of the glass ribbon 100 and hence allows for a controlled alignment of the glass ribbon. Such movable mounting of a roller is shown in FIG. 4b. Second roller 5 is movably mounted by means of a rocker bearing 52. Glass ribbon 100 is transported along its longitudinal extension 101 and engages on second roller 5. Again, a buckling 111 is caused, but it will be lower since due to its movable mounting the second roller 5 will deflect upwards. Due to the lower buckling the risk of breakage of the glass ribbon 100 is significantly reduced.

The movable mounting of the second roller 5 may be passive. This means that the mounting will only respond to an unevenness of the glass ribbon 100 by allowing the roller to yield.

However, the movable mounting of second roller 5 may as well be active. In this case, a sensor or monitoring means is additionally provided which detects unevenness of the glass ribbon 100 before the latter contacts the second roller 5 and causes the second roller 5 to alter its position using a control device. Due to the change in position of the second roller 5, corresponding forces or moments are imparted to the glass ribbon 100. The lateral position of the edge of the glass ribbon leaving the chicane can be adjusted by tilting the roller 5. Due to the tilting, an angle is resulting between the edge of the entering ribbon portion and the portion of the ribbon that has been passed.

The sensor may as well be adapted to detect irregular courses of the edges of the glass ribbon perpendicular to the advancement direction. Such undulating courses are referred to as camber. In response to the detected deviations of the edge contours from a straight course, one or more of the rollers 4, 5, 6 may be adjusted in their spatial position, by a control device, to correct the course of the edge by forces or moments imparted to the glass ribbon so as to stabilize the course of the ribbon. If in a later process step the glass ribbon 100 is wound up to form a roll, these corrective measures will increase the quality of the winding level of the glass ribbon in the wound-up state.

Occurring irregularities of the course of the ribbon are detected using the method disclosed in applicant's DE 10 2015 108 553.

This method detects a processing error during manufacturing of a strip of material preferably in the form of a thin glass ribbon moving in a longitudinal direction. The processing error causes a particularly geometric defect of the material strip. A profile of a parameter imparted to the material strip, depending on a longitudinal coordinate thereof and influenced by the defect is detected, the profile having an extension in a direction lateral to the longitudinal direction. Then, the processing error is determined as a function of the profile of the parameter.

Figure 5:
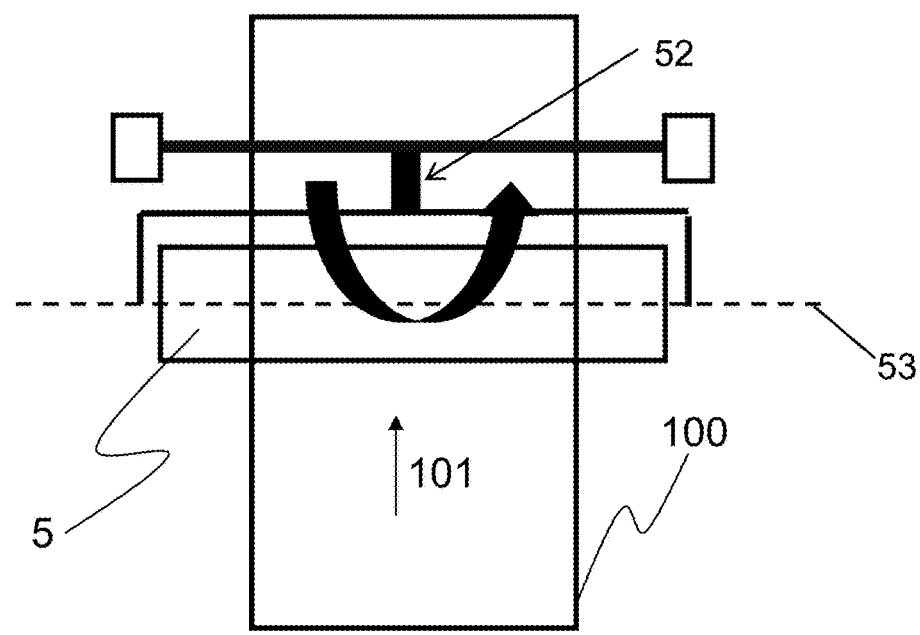
FIG. 5 is a plan view of a roller with rocker bearing according to the invention.

FIG. 5 shows a plan view of a second roller 5 with a rocker bearing 52. Second roller 5 rotates about a roller axis 53. Below the second roller 5 a glass ribbon 100 is conveyed along the direction of its longitudinal extension 101. Rocker bearing 52 enables the second roller 5 to move perpendicular to the glass ribbon, i.e. perpendicular to the plane of the figure so as to yield to any unevenness in the surface of the glass ribbon 100, which reduces the risk of breakage of the glass ribbon 100.

The mounting of the intermediate roller 5 may as well be configured so that the roller 5 is rotated about an axis which is in parallel to the advancement direction. Pivoting about an axis of this alignment permits to compensate for irregularities in the course of the ribbon in which the outer edges extend obliquely to the advancement direction, which upon subsequent winding into a roll would result in a low quality of the winding level. The invention, however, permits to limit the average deviation of the position of the edges of superimposed layers of the glass ribbon to less than three times the thickness of the glass ribbon.

FIG. 6 shows the apparatus of the invention comprising the roller chicane consisting of rollers 4, 5, 6. The sheet-like element 1 or glass ribbon 100 is transported from left to right in the drawing by two transport means 7 and 70. The sheet-like element 1 or glass ribbon 100 is drawn from a reservoir 17. In the case of glass ribbon 100, reservoir 17 contains viscous heated glass 19 which is exiting the reservoir 17 at the bottom thereof, due to gravity, in the form of a glass ribbon. After having left reservoir 17, the glass ribbon 100 is advanced by transport means 7, 70 and is passed through the roller chicane comprising rollers 4, 5, 6. When leaving the transport means, the glass ribbon 100 is wound up so that the ribbon is finally available in wound-up state 103.

In FIG. 6, the vertical position of the intermediate or second roller 5 is adjusted by positioning means 22. This may be effected both actively and passively, as will be described in more detail below.

Figure 9:
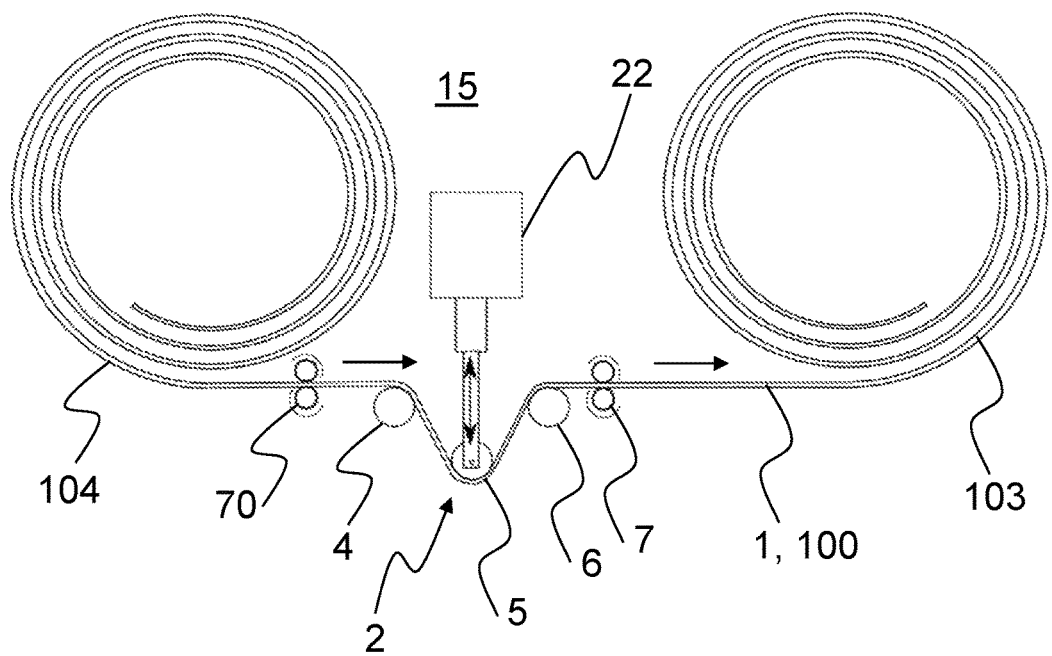
FIG. 9 shows the apparatus of FIG. 6 together with a roll from which the sheet-like element is unwound and with the element in wound-up state.

FIGS. 7, 8, and 9 show further possible applications of the apparatus 2 according to the invention.

FIG. 7 shows the apparatus of FIG. 6, supplemented by severing means 30. The latter cut the glass ribbon 100, for example when the glass ribbon 100 in its wound-up state 103 has reached a predetermined diameter. Then, the roller onto which the glass ribbon 100 has been wound has to be replaced.

In order to prevent that during the replacement of the roller onto which the glass ribbon 100 has been wound the glass ribbon 100 moves downwards to the ground after leaving transport means 7, the intermediate roller 5 is moved downwards by positioning means 22, that means it is lowered. As a consequence, the path along which the glass ribbon 100 moves becomes longer. As a result thereof, in case of a constant advancement rate, no portion of the glass ribbon 100 will fall down and be lost for further processing. This situation after severing of the glass ribbon 100 during the replacement of the roller for winding up the glass ribbon 100 is shown in FIG. 8.

FIG. 9 shows the apparatus of FIG. 6, wherein instead of reservoir 17 the glass ribbon 100 is provided in wound-up state 104. Before passing transport means 70, 7 and the chicane comprising rollers 4, 5, 6, the glass ribbon 100 is unwound. Thus, in FIG. 9 the apparatus of the invention is used for a roll-to-roll process. In such a process, the glass ribbon is unwound from the first roll, processed, and then rewound. In a very simple case, processing may consist of creating an improved winding level using the inventive apparatus.

The distribution of tensile stress for a sheet-like element 1 provided in the form of a glass ribbon 100 was calculated by simulations. For these calculations, two different types of glass were assumed, namely AF32 and D263. Material characteristics of these two types are listed below:
AF32
Young's modulus E=74.8 GPa
Poisson's ratio v=0.238
Density ρ=2430 kg/m³
D263
Young's modulus E=72.9 GPa
Poisson's ratio v=0.208
Density ρ=2510 kg/m³.

In the calculations performed, nine variants were considered, which variants differ in terms of glass type, glass thickness, roller distance, roller lowering, and wrap angle. These variants are summarized in an overview in the table below.

| No | Glass type | Glass thickness [µm] | Roller distance [mm] | Roller lowering [mm] | Wrap angle [°] |
|---|---|---|---|---|---|
| 1 | AF32 | 50 | 500 | 100 | 21 |
| 2 | AF32 | 50 | 500 | 200 | 40 |
| 3 | AF32 | 50 | 500 | 300 | 66 |
| 4 | AF32 | 50 | 250 | 100 | 49 |
| 5 | AF32 | 50 | 250 | 200 | 95 |
| 6 | AF32 | 50 | 250 | 300 | 125 |
| 7 | AF32 | 100 | 500 | 100 | 6 |
| 8 | AF32 | 100 | 500 | 300 | 62 |
| 9 | D263 | 50 | 500 | 100 | 66 |

Roller distance refers to the distance of the axes of symmetry of the two outer rollers 4 and 6.

Roller lowering refers to the position of the intermediate roller 5 as a height difference between the axis of symmetry of the second roller 5 and the plane in which the sheet-like element 1 or glass ribbon 100 is conveyed.

The wrap angle listed in the above table is the wrap angle $\alpha_2$ of the glass ribbon 100 at intermediate roller 5. The wrap angle increases with decreasing roller distance and increases with further lowering of the second roller 5.

For all variants 1 to 9 represented in the above table the following procedure was assumed for the calculation.

In a first step, intermediate roller 5 is lowered by the amount specified in each case. During the lowering of the roller 5, two maxima of tensile stress are caused at the upper face 10 and one maximum of tensile stress is caused at the lower face 11 of glass ribbon 100. These maxima do not exceed 26.6 MPa.

Then, in a second step, the glass ribbon or the rollers are accelerated to the advancement rate. During this acceleration process, high temporary tensile stresses exceeding a value of 200 MPa are resulting in the glass ribbon 100.

The third step describes the transportation of the glass ribbon at a constant advancement rate. The temporary tensile stresses will have been disappeared after about 3 to 5 seconds. Then, a steady state is achieved in which tensile stress in the glass ribbon 100 does not exceed 27.8 MPa.

Calculations were performed for the stress distributions in the moving ribbon, that is during the transportation operation, compared to the stress distribution in the stationary, i.e. non-moving ribbon.

The performed calculations have shown that the distribution of tensile stress in the non-moving ribbon corresponds to the distribution in the moving ribbon. Only the maximum magnitude of tensile stress differs by about 1 MPa between the non-moving and moving ribbon, which corresponds to an increase in tensile stress by less than 5%.

A comparison of variants 1 to 6 shows that with a glass thickness of 50 µm the magnitude of tensile stress of about 26 MPa only depends on the roller diameter.

The extension of the zone in which the tensile stress occurs, increases with decreasing roller distance.

The extension of the zone in which the tensile stress occurs, also increases with increasing roller lowering.

A comparison of variants 1 to 3 with variants 7 and 8 reveals that in case of a greater glass thickness (100 µm in variants 7 and 8) the magnitude of tensile stress moreover depends on the geometry of the roller chicane, i.e. on the respective selected combination of roller distance and roller lowering.

A significant effect of a change in the type of glass utilized (D263 instead of AF32) cannot be found. This is due to the almost equal Young's modulus of the two selected types of glass.

The glass ribbon 100 is deflected by rollers 4, 5, 6, resulting in bending forces within the glass ribbon 100. The extent of the deflection and thus the magnitude of the tensile forces additionally arising in the glass ribbon 100 is indicated by the size of the wrap angle. The greater the wrap angle, the greater the deflection of glass ribbon 100 and thus of the bending forces occurring in the glass ribbon 100.

Assuming that the glass ribbon 100 engages a roller all the way between the first and last contact points, the glass ribbon is bent along a line L equal to the length of an arc of a circle sector whose central angle is equal to the wrap angle and whose radius is equal to the roller radius. Along line L the glass ribbon is bent with a bending radius which is equal to the roller radius. The bending radius is correlated with the tensile force occurring in that with decreasing bending radius the occurring tensile force increases.

Hard brittle materials exhibit a different behavior than for example ductile materials with respect to failure under load. Ductile materials, especially many metals, will stretch to its yield point under a bending or tensile stress and will then tear at a relatively well-defined load. By contrast, breakage of hard brittle materials does not take place at a strength threshold in terms of a material characteristic, but randomly with a probability dependent on the applied tensile stress. The parameters of fracture probability (e.g. normal or Weibull distribution) are primarily dependent on the processing of the relevant sample, but are only slightly dependent on the material, in contrast to the ductile materials.

Using the method disclosed in Applicant's DE 10 2014 110 856, a bending radius can be determined for a glass of a given type and thickness as a function of an applied tensile stress, at which the glass will not break with high probability. In this method, a strip-shaped sample of the material to be examined is fastened to a holder at its two ends. Subsequently, the two holders are pulled apart thereby subjecting the sample to a tensile stress. The tensile force at which the sample tears apart is logged. This is performed for a plurality of samples. Based on the logged tensile forces, the average of the bending radii corresponding to these tensile forces and the variance thereof is calculated.

The tensile stress from the simulation described above is used for determining the minimum bending radius, which then conversely determines the geometry to be selected for the chicane defined by the three rollers 4, 5, 6.

Alternatively, the minimum bending radius as a function of the applied tensile stress may as well as be determined by the method disclosed in Applicant's DE 10 2013 110 803.

In this method, a thin glass is subjected to a tensile force smaller than $$1.15 \cdot \min\left(\bar{\sigma}_a - \Delta_a 0.4\left(1 - \ln\left(\frac{A_{ref}}{A_{App}}\Phi\right)\right), \bar{\sigma}_e - \Delta_e 0.4 \cdot \left(1 - \ln\frac{L_{ref}}{L_{App}}\Phi\right)\right),$$

wherein $\bar{\sigma}_a$ is the mean value of the tensile stress at break in the surface area of the sample and $\bar{\sigma}_c$ is the mean value of the tensile stress for a crack emanating from the edge of a reference sample, and wherein $\Delta_a$ and $\Delta_c$ are the associated standard deviations of these mean values. $L_{ref}$ denotes the edge length of the reference sample and $A_{ref}$ the surface area thereof. $A_{App}$ denotes the surface area of the thin glass, and $L_{App}$ is the summated edge length of opposite edges of the thin glass. $\Phi$ is a predefined maximum fracture rate within a period of at least half a year.

In a further method step the thin glass is bent, wherein the minimum bending radius R is related to the tensile stress $\sigma_{App}$ as follows:

$$\sigma_{App} = \frac{E}{1-v^2}\frac{t}{2R},$$

wherein E denotes the Young's modulus, t the thickness of the thin glass, and the Poisson's ratio of the glass.

If this method is chosen for determining the minimum bending radius, the tensile stress is again taken from the simulation described above, which then conversely determines the geometry to be selected for the chicane defined by the three rollers 4, 5, 6.

Based on the so determined minimum bending radius, the minimum roller radius is defined since the roller radius is equal to the bending radius of the glass ribbon 100, as already explained above.

A wrap angle greater than 0° is favorable so that a defined minimum bending radius is provided which is determined by the roller diameter. For reliably guiding the glass ribbon it is also advantageous if the ribbon not only contacts the roller along a straight line in parallel to the roller axis. The wrap angles of the examples in the above table were determined by a finite element calculation. According to another embodiment, the course of the glass ribbon or more generally of the sheet-like element over the at least one deflection element of the deflection arrangement may be determined using a spline function. For this purpose, at least one interpolation point, also known as knot, of the spline function is defined on each of the deflection elements. In particular a cubic spline is useful for this purpose. The spline function is created subject to the constraint that at the knots the surface of the element 1 made of hard brittle material extends tangentially to the surface of the deflection element.

FIGS. 10 to 13 schematically illustrate individual method steps of the toughening process. The illustrated toughening process may be integrated into the method of the invention.

In the embodiment of the toughening process schematically illustrated in FIG. 10, the thin glass has a thickness in a range from 30 to 144 μm. The arrows here indicate the advancement direction of the glass ribbon 100 conveyed by rollers 131, 132, 133.

The glass ribbon 100 is first cleaned and dried. This process step is schematically represented by rectangle 140. Subsequently, the glass ribbon 100 is passed through a continuous furnace 150. In continuous furnace 150, glass ribbon 100 is heated to a temperature in the range from 300 to 550° C. and leaves the continuous furnace 150 at a temperature of about the toughening temperature $T_H$. This avoids stresses induced in the glass sheet by a temperature difference in subsequent step b). It has been found particularly advantageous to heat glass ribbon 100 in a continuous furnace 150 having a temperature gradient. The temperature gradient in furnace 150 is schematically represented by arrow 220. The temperature gradient in the furnace is defined by lower temperature $T_u$ and higher temperature $T_o$ in the furnace. The opening of furnace 150 through which the glass ribbon 100 enters the furnace is at temperature $T_u$ in this case. Within the furnace, the temperature rises up to temperature $T_o$ so that when leaving the furnace the glass ribbon 100 has a temperature $T_o$ or close to $T_o$. Preferably, temperature $T_u$ is in a range from 20 to 150° C., and/or the higher temperature $T_o$ is in a range from 350 to 550° C. By heating the glass ribbon 100 using a corresponding temperature gradient, stresses are prevented from arising in the glass. It has been found particularly advantageous to heat the glass ribbon to a temperature that corresponds to the toughening temperature $T_H$ in step b).

Moreover, heating using a temperature gradient allows to relieve possibly existing stresses in the glass that might have been induced by the manufacturing process.

The glass ribbon 100 preheated in step a) is passed through toughening furnace 160 in step b). The toughening furnace has a toughening temperature $T_H$ within a range from 300 to 550° C. Toughening temperature $T_H$, i.e. the temperature at which the ion exchange takes place, depends on the particular glass composition of the glass ribbon and on the exchange depth of layer (DOL) that is to be obtained, and on the desired compressive stress Cs.

Toughening furnace 160 includes a molten salt bath 170 through which the glass ribbon 100 is pulled. Molten salt bath 170 contains potassium ions, so that an ion exchange takes place in the regions near the surface of the glass ribbon, during which sodium and/or lithium ions are replaced by potassium ions.

In this embodiment, roller 132 in toughening furnace 160 is entirely or partially immersed in molten salt bath 170, so that the material of roller 132 should be inert or at least substantially inert with respect to the molten salt bath. Suitable materials for roller 132 have been found to include glass, metals, and ceramics. Composite materials made of glass, metal and/or ceramics may be used as well.

The advancement speed of the glass ribbon is adjusted so that the glass ribbon remains in the molten salt bath for the required toughening time $t_H$. Toughening time $t_H$ depends on the toughening temperature $T_H$ and on the exchange depth of layer DOL to be achieved. For example, penetration depths of about 3 to 5 μm may already be achieved with toughening durations between 10 and 20 minutes.

After the toughening process, the toughened glass ribbon is cooled in step c) in a further continuous furnace 180. Continuous furnace 180 provides for slow cooling of the glass ribbon 100 so that stresses in the glass are avoided. In the illustrated embodiment, furnace 180 also has a temperature gradient which is represented by arrow 221. At the opening through which the glass ribbon 100 enters furnace 180, furnace 180 has a temperature $T_o$. Along the advancement direction of glass ribbon 100 the temperature in furnace 180 decreases, so that at the opening through which the glass ribbon 100 leaves the furnace, the furnace has a temperature $T_u$, with $T_o > T_u$. Preferably, temperature $T_o$ is about the toughening temperature $T_H$. Cooling to temperatures of less than 150° C. has been found particularly advantageous.

FIG. 11 shows a variant of the toughening process according to which the toughening process is performed following the drawing process (not shown) for producing a thin glass ribbon 100. Since after the drawing process the glass ribbon 100 has a temperature of about the toughening temperature $T_H$ or even higher, preheating of the glass ribbon 100 (step a)) can be omitted in the embodiment variant shown in FIG. 11. Glass ribbon 100 is merely cleaned and dried and is then subjected to method steps b) and c) similar to the variant of the toughening process shown in FIG. 10.

Therefore, this variant is particularly advantageous from an energetic point of view.

The potassium ions needed for ion exchange may as well be applied to the surfaces of the glass ribbon 100 in the form of a solution. This is schematically illustrated in FIG. 12. First, glass ribbon 100 is cleaned and dried. In a subsequent step, glass ribbon 100 runs through a device 210 in which a potassium salt solution 211 is applied to the upper and lower surfaces of glass ribbon 100. This solution preferable is an aqueous solution. In the illustrated embodiment, solution 211 is sprayed onto the surfaces of the glass ribbon.

Subsequently, in step b), the so treated glass ribbon 100 passes through furnace 150 in which it is heated to a temperature of about the toughening temperature $T_H$ whereby the solvent evaporates. Subsequently, the glass ribbon 100 passes through toughening furnace 160 which has a temperature $T_H$ in the range from 300 to 550° C. In this step b) the ion exchange takes place during which sodium and/or lithium ions in regions near the surface of the glass ribbon are replaced by potassium ions previously applied to the glass surface. The selected dwell time $t_H$ depends on the desired exchange depth of layer DOL.

Figure 13:
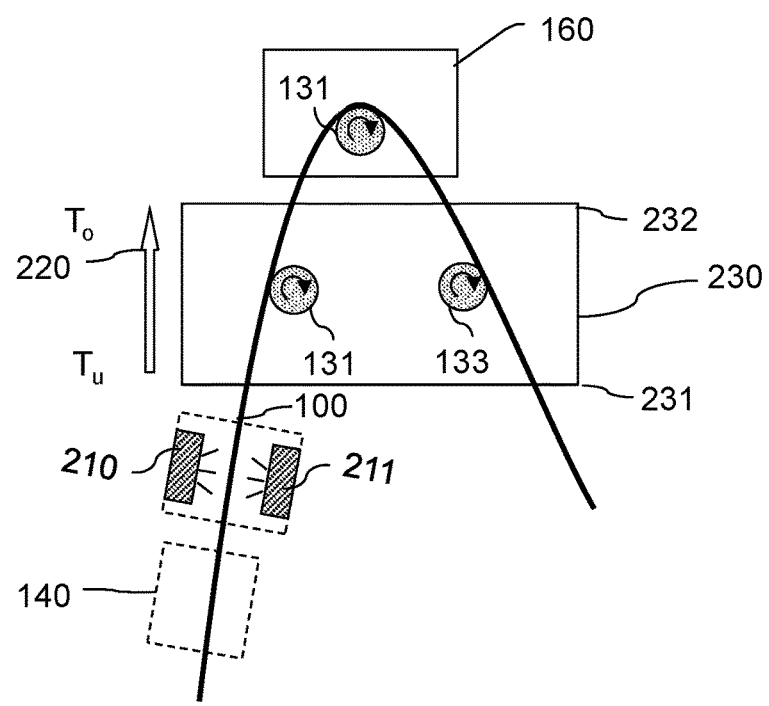
FIG. 13 is a schematic view of a toughening process in which the method steps a) and c) are performed in the same furnace.

FIG. 13 illustrates another variant of the method according to the invention, in which the glass ribbon 100 is passed through the same continuous furnace 230 with temperature gradient in steps a) and c). Furnace 230 has a temperature gradient illustrated by arrow 220, with a lower temperature $T_u$ and a higher temperature $T_o$. Glass ribbon 100 enters and leaves the furnace 230 through two opposite openings 231 and 232, respectively. At opening 231, the furnace has a lower temperature $T_u$, and at opening 232 a higher temperature $T_o$, with $T_o > T_u$.

According to this variant, in step a) the glass ribbon 100 is advanced into furnace 230 through opening 231. While glass ribbon 100 passes through furnace 230 in step a) it is heated, and it leaves furnace 230 through opening 232 at temperature $T_o$. In the subsequent step b), the ion exchange is takes place in furnace 160. According to this embodiment variant of the invention, toughening furnace 160 only has one opening. In this variant of the invention, the toughening roller 132 is provided in form of a deflection roller so that glass ribbon 100 will undergo a change in the advancement direction by the toughening roller.

After the glass ribbon 100 has been heated to the toughening temperature $T_H$ for the toughening time $t_H$ within furnace 160, the glass ribbon 100 leaves furnace 160 through the opening. For cooling the so toughened glass ribbon 100 the latter is pulled through opening 232 into furnace 230 in step c). Here, due to the temperature gradient of the furnace, the glass ribbon slowly cools down to the lower temperature $T_u$ before leaving furnace 230 through opening 231.

It will now be described in more detail below how the course of the sheet-like element over one or more deflection elements can be determined using a spline function, and how parameters of the occurring tensile stress can be derived therefrom. One embodiment of the invention with respect to a description of the course of the sheet-like element generally comprises to determine the actual minimum bending radius from the calculated course, i.e. from the spline function. This embodiment may be implemented in the arrangement for stabilization of the ribbon according to the invention or may be performed with this arrangement, for determining a current tensile stress which is determined by the position of the deflection elements. However, the method of determining the minimum bending radius based on a spline interpolation may generally as well be used as a proof test. The proof test documents and verifies that the sheet-like element withstands the tensile stress exerted on the surface during the proof-test, which is defined by the minimum bending radius.

Accordingly, a method is provided for testing the strength of the sheet-like element 1 made of hard brittle material, in particular glass, and having two opposite faces 10, 11, wherein the element 1 is guided over one or more deflection elements with each of its faces, preferably over a total of at least three deflection elements, whereby the element is bent so that in the portion in which one of the faces 10, 11 of the element 1 made of hard brittle material is in contact with the deflection element the opposite face 10, 11 thereof is subjected to a tensile stress; and wherein the method further comprises monitoring and determining whether the element 1 has a predefined breaking strength equal to the applied tensile stress or whether the element 1 breaks under the applied tensile stress, wherein the tensile stress is determined from the minimum radius of curvature of a spline function, in particular a cubic spline, between knots defined on the surface of the deflection elements.

Figure 14:
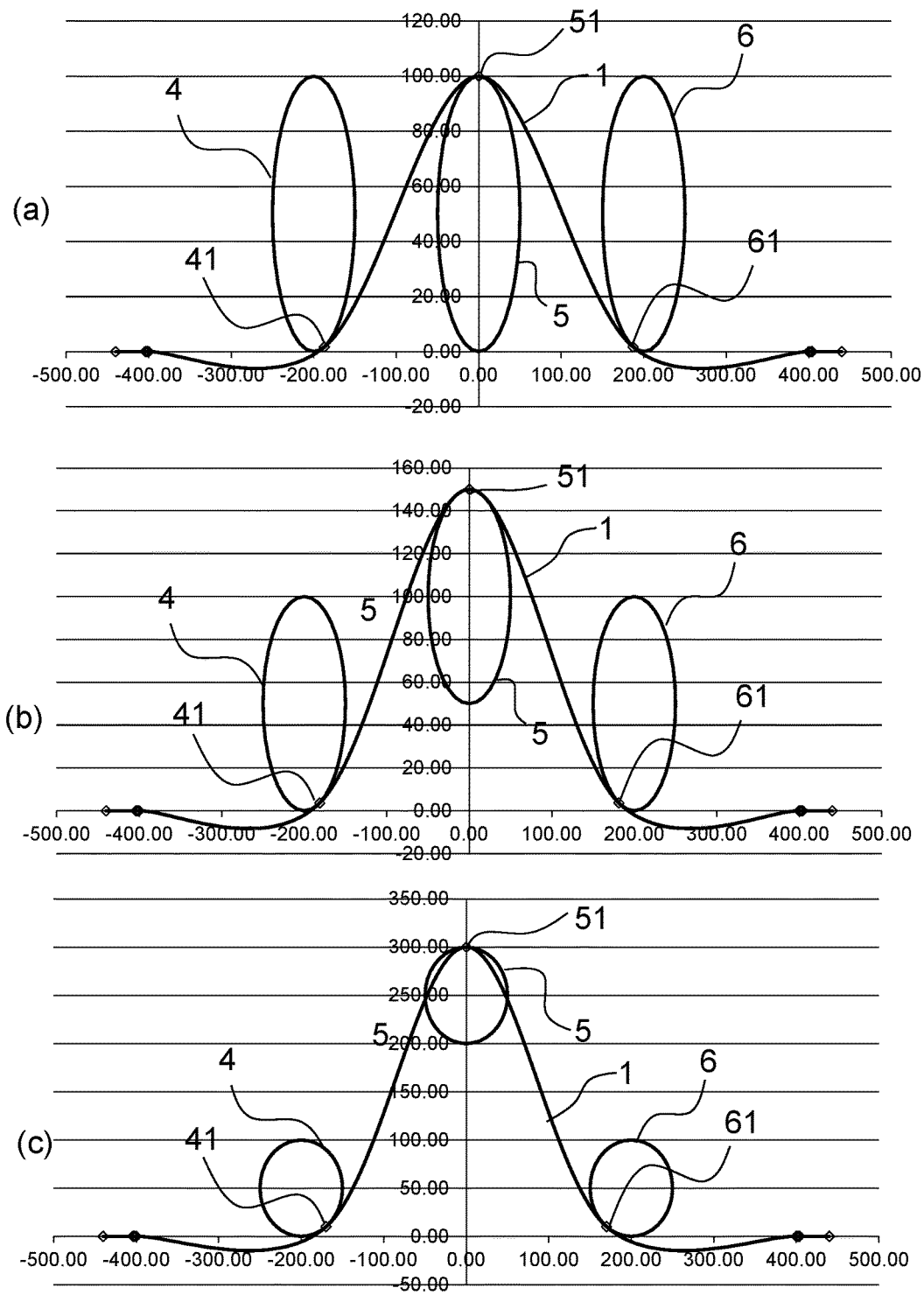
FIG. 14 shows three graphs with cubic spline functions which describe the course of a glass ribbon over three rollers.

In this respect, FIG. 14 shows three examples. Three graphs with spline functions are shown, each of which represents the course of a sheet-like element 1, in particular a glass ribbon, through an arrangement comprising three deflection elements in the form of rollers 4, 5, 6, that means in accordance with the examples of FIGS. 1-3 and 6-9. In the graphs, the rollers are represented by appropriate functions. Because of the different scales of the abscissa and ordinate, rollers 4, 5, 6 do not appear circular, but oval.

The spline function is defined by interpolation points, or knots, 41, 51, 61 on the rollers. Depending on the location of the intermediate roller 5, the cases as shown in graphs (a), (b), (c) are obtained. In the case of graph (a), the deflection is so small that the radius of curvature on roller 5 is greater than the radius of the roller. In the case of graph (b), roller radius of roller 5 and radius of curvature at node 51 are matched. In graph (c), finally, for a single knot 51 due to the large deflection of roller 5 relative to rollers 4, 6, the radius of curvature of element 1 is smaller than the radius of the roller at knot 51. In this case, the course of element 1 can no longer be described by the three illustrated knots 41, 51, 61. Rather, a particular wrap angle is obtained. The element engages the roller surface along the associated circular arc, such as shown in FIG. 2 and FIG. 3. In this case, the minimum radius of curvature of element 1 is then determined by the radius of the roller. In this case, in which the radius of curvature $R_E$ of the element 1 at a knot is smaller than the radius of curvature $R_U$ of the deflection element, $R_E < R_U$, a spline function correctly reflecting the course of element 1 over the deflection element with the respective knot (and also completely) may be determined as follows: In this case at least two knots are provided whose position on the surface of the deflection element is varied until the curvature radii of element 1 are sufficiently well matched with the curvature radius of the surface of the deflection element. The term "sufficiently well" again means with a deviation less than a predetermined threshold. The position of the knots may be quickly found using an interpolation method. For example the method of bisection is suitable. Bisection searches for the zero point of a suitable function by successive interval halving. In particular for this purpose, the zero point of the difference between radii of curvature $R_E - R_U$ may be easily sought.

The case that the minimum radius of curvature is determined by the curvature of the surface of the deflection element, however, does not apply for rollers 4 and 6 in graph (c). Possibly, in case of only tangential contact, the radius of curvature might be smaller than at the intermediate roller 5 here. As a result thereof, faces 10, 11 are then subjected to different tensile stresses. Therefore, the performed proof test may possibly not have the same informative value for both faces. Generally, without being limited to the specific illustrated examples, it is therefore contemplated according to a further embodiment of the invention that the sheet-like element 1 is passed over a deflection element at least once with each of its faces 10, 11, whereby the opposite face is subjected to a tensile stress, wherein a spline function with knots on the deflection elements is used to verify that the tensile stresses at the two faces 10, 11 are equal or at least differ by less than a predetermined threshold. More simply stated, the spline test is used to verify that the proof test is symmetrical for predetermined positions of the deflection elements.

Now, with the knowledge about the course of element 1 acquired using the spline function, according to a refinement of this embodiment of the invention the position of the deflection elements can be altered so as to match the radii of curvature and therefore the tensile stresses exerted due to the deflection on the deflection elements. Thus, first it is checked, using a spline function with knots on the deflection elements, whether the tensile stress is the same on both faces or at least differs by less than a predetermined threshold value, and for the case that the threshold is exceeded, the position of at least one of the deflection elements is altered in a manner so as to reduce the difference in tensile stress between the two faces 10, 11. Particularly suitable for this purpose is to reduce the distance between deflection elements 4 and 6.

LIST OF REFERENCE NUMERALS

| | |
|---|---|
| 1 | Sheet-like element |
| 2 | Apparatus for stabilizing 1 |
| 4 | First roller |
| 5 | Second roller |
| 6 | Third roller |
| 7 | Transport means |
| 8 | Conveyor belt |
| 9 | Conveyor belt |
| 10 | Upper face of 1 |
| 11 | Lower face of 1 |
| 13 | Sensor |
| 17 | Reservoir |
| 19 | 1, 100 in raw state |
| 22 | Positioning means for 5 |
| 24 | Monitoring means |
| 30 | Severing means |
| 40 | Surface of 4 |
| 50 | Surface of 5 |
| 51 | Rigid bearing of 5 |
| 52 | Rocker bearing of 5 |
| 53 | Axis of 5 |
| 60 | Surface of 6 |
| 70 | Transport means |
| 100 | Glass ribbon |
| 101 | Longitudinal direction of 100 |
| 103 | 1, 100 in wound-up state after passing through 2 |
| 104 | 1, 100 in wound-up state before passing through 2 |
| 110 | Buckling of 100 |
| 111 | Buckling of 100 |

What is claimed is:

1. A method for stabilizing the position of a sheet-like element made of hard brittle material during transportation thereof along a transport path, the sheet-like element having an upper face and a lower face and two outer edges, the method comprising the steps of:

providing the sheet-like element of a given material type and thickness;

providing a deflection arrangement comprising at least one deflection element adapted for deflecting the sheet-like element along the transport path thereof with a directional component perpendicular to the upper and lower faces, whereby the sheet-like element is bent, wherein the at least one deflection element is mounted for pivoting or moving about a pivot axis parallel to the transport path and for moving in a direction perpendicular to the upper and lower faces of the sheet-like element so that by a movement of the deflection element the position of the upper and lower faces of the sheet-like element can be altered;

monitoring the outer edges of the sheet-like element for a deviation from a straight course during the transportation of the sheet-like element without contacting the outer edges; and correcting for the deviation of the course of the outer edges of the sheet-like element from the straight course during the guiding of the sheet-like element by pivoting or moving the at least one deflection element in a vertical direction, wherein the at least one deflection element comprises a first element having a first element surface, a second element having a second element surface, and a third element having a third element surface, wherein the first element is arranged at a distance from the third element and the second element is arranged between the first and the third elements, and wherein at least one of the first, second, and third elements is a movably mounted element that is movably mounted by a rocker bearing so that the movably mounted element is pivotable about the pivot axis, and wherein the method further comprises the step of guiding the sheet-like element along the transport path thereby passing the upper or lower face thereof at least once over the at least one of the first, second, and third elements.

2. The method as claimed in claim 1, wherein the first element comprises a first roller having a first roller surface, the second element comprises a second roller having a second roller surface, and the third element comprises a third roller having a third roller surface.

3. The method as claimed in claim 2, wherein the first roller and the third roller are separated from one another by a distance that is selected depending on the thickness of the sheet-like element.

4. The method as claimed in claim 2, wherein the second roller is moved in a vertical direction to compensate for irregularities in a surface contour of the sheet-like element.

5. The method as claimed in claim 2, wherein the correcting step further comprises correcting for the deviation of the course of the outer edges of the sheet-like element from the straight course during the guiding of the sheet-like element by pivoting the second roller and/or adjusting a position of at least one of the first, second, and third rollers in the vertical direction.

6. The method as claimed in claim 2, wherein the sheet-like element is a glass ribbon that is guided over the first, second, and third rollers in a direction along its longitudinal extension.

7. The method as claimed in claim 6, wherein after having been passed over the first, second, and third rollers, the glass ribbon is wound up to form a roll and a quality of a winding level is less than 2.0 mm.

8. The method as claimed in claim 7, wherein during winding, layers of a second material are arranged between layers of the glass ribbon.

9. The method as claimed in claim 1, further comprising, after the guiding of the sheet-like element, the step of winding up the sheet-like element, wherein once having been wound up, layers of the sheet-like element are superimposed one above the other.

10. The method as claimed in claim 1, further comprising, prior to the guiding of the sheet-like element, the step of unwinding the sheet-like element from a roll.

11. The method as claimed in claim 1, wherein the hard brittle material is an alkali-containing glass ribbon that is chemically toughened while being transported along the transport path; wherein the thickness of the glass ribbon is less than 300 μm, and wherein the process of chemical toughening comprises at least the steps of:
   (a) preheating the glass ribbon to a temperature in a range from 300 to 550° C.;
   (b) ion exchanging surface zones at a toughening temperature in a range from 350 to 550° C.; and
   (c) cooling the glass ribbon to a temperature of less than 150° C., and wherein prior to step (a) and/or during step (b) potassium ions are applied to the upper and lower faces.

12. The method as claimed in claim 11, wherein prior to step (a) a solution of a potassium salt is applied to the upper and lower faces by spraying.

13. The method as claimed in claim 12, wherein the potassium-containing salt solution is an aqueous solution containing salts selected from the group consisting of $KNO_3$, $K_3PO_4$, $KCl$, $KOH$, $K_2CO_3$, and mixtures thereof.

14. The method as claimed in claim 13, wherein step (b) comprises passing the glass ribbon through a potassium-containing molten salt bath.

15. The method as claimed in claim 12, wherein step (a) comprises passing the glass ribbon through a continuous furnace having a temperature gradient.

16. The method as claimed in claim 15, wherein the temperature gradient increases with respect to the transport path of the glass ribbon, and/or wherein the continuous furnace has a lower temperature that is less than 150° C. and a higher temperature of in a range from 350 to 550° C.

17. The method as claimed in claim 12, wherein step (c) comprises cooling the glass ribbon in a furnace that has a temperature gradient, wherein the temperature gradient decreases with respect to the advancement direction of the glass ribbon, and/or wherein the furnace has a lower temperature that is less than 150° C. and a higher temperature that is in a range from 350 to 550° C.

18. The method as claimed in claim 12, wherein step (b) comprises using a roller in a toughening furnace, the roller being made of a material selected from the group consisting of glass, ceramics, metal, and composite materials of glass, ceramics, and/or metal.

19. The method as claimed in claim 1, further comprising determining a course of the sheet-like element over the at least one deflection element using a spline function, wherein at least one knot of the spline function is defined on each deflection element.

20. The method as claimed in claim 19, further comprising determining a minimum bending radius of the sheet-like element from the spline function.

21. A method for stabilizing the position of a sheet-like ribbon made of hard brittle material during transportation thereof along a transport path, the sheet-like ribbon having an upper face and a lower face and two outer edges, the method comprising the steps of:

provide a sheet like ribbon;

providing a deflection arrangement comprising at least one deflection element adapted for deflecting the sheet-like ribbon along the transport path thereof with a directional component perpendicular to the upper and lower faces, whereby the sheet-like ribbon is bent, wherein by a movement of the at least one deflection element the position of the upper and lower faces of the sheet-like ribbon can be altered;

monitoring the two outer edges of the sheet-like ribbon for a deviation from a straight course during the transportation of the sheet-like ribbon without contacting the two outer edges; and correcting for the deviation of the course of the two outer edges of the sheet-like ribbon from the straight course during the transportation of the sheet-like ribbon by pivoting or moving the at least one deflection element in a vertical direction, the at least one deflection element comprising a roller that is tiltable so that due to a tilting, an angle is produced between a portion of the two edges entering the roller and the portion after passing the roller.

22. A method for stabilizing the position of a sheet-like element made of hard brittle material during transportation thereof along a transport path, the sheet-like element having an upper face and a lower face and two outer edges, the method comprising the steps of:

providing the sheet-like element of a given material type and thickness;

providing a deflection arrangement comprising at least one deflection element adapted for deflecting the sheet-like element along the transport path thereof with a directional component perpendicular to the upper and lower faces, wherein the at least one deflection element comprises a first element having a first element surface, a second element having a second element surface, and a third element having a third element surface, whereby the sheet-like element is bent, wherein the at least one deflection element is mounted for pivoting about an axis parallel to the transport path or for moving in a direction perpendicularly to the upper and lower faces of the sheet-like element so that by a movement of the deflection element a position of the upper and lower faces of the sheet-like element can be altered;

monitoring the outer edges of the sheet-like element for a deviation from a straight course during the transportation of the sheet-like element without contacting the outer edges; and correcting for the deviation of the course of the outer edges of the sheet-like element from the straight course during the transportation of the sheet-like element by pivoting or moving the at least one deflection element in a vertical direction and wherein the sheet-like element is bent over the three elements along an undulated path, and each of the upper and lower faces is in contact with at least one of the element surfaces.

* * * * *